Patented Feb. 1, 1944

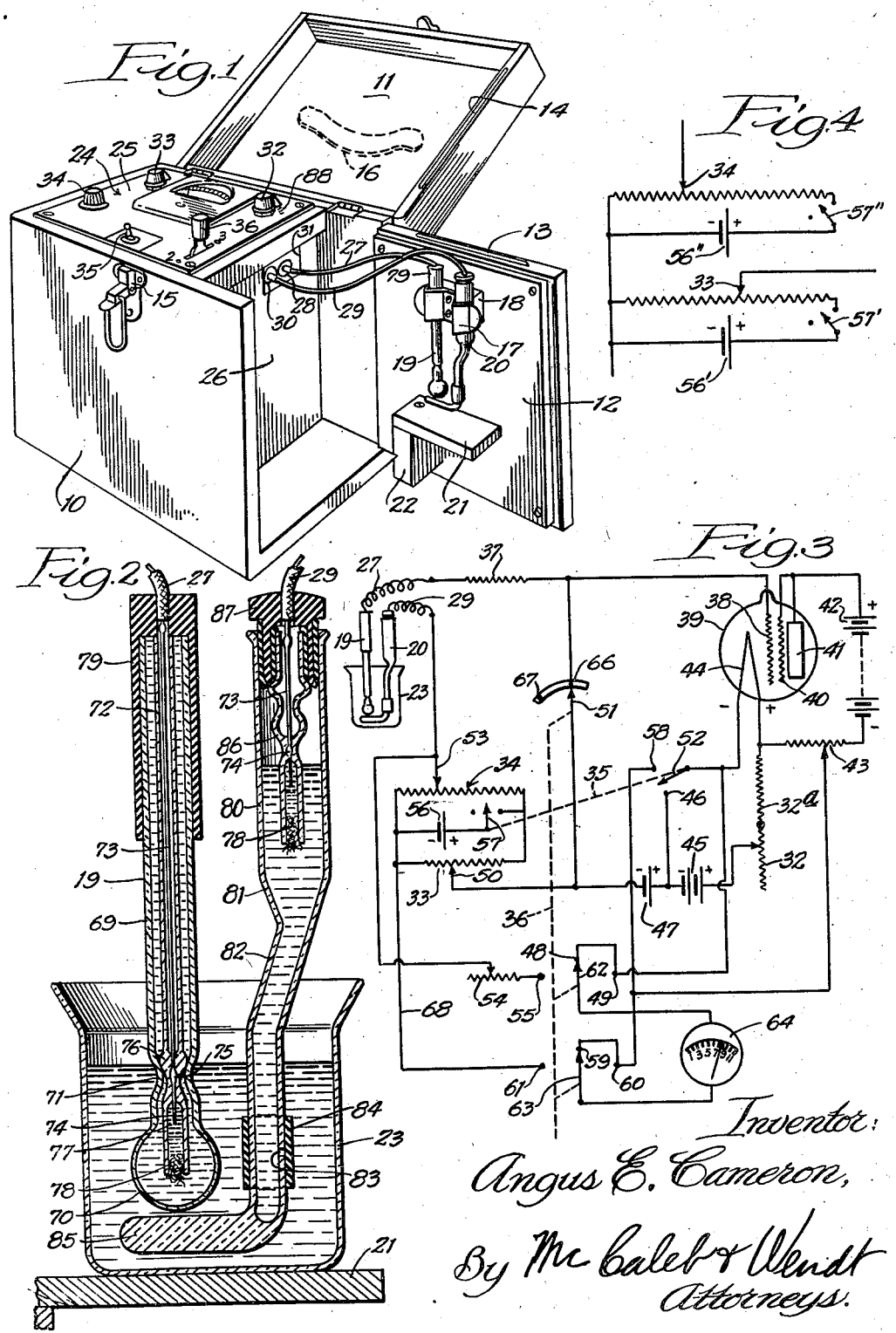

2,340,641

UNITED STATES PATENT OFFICE 2,340,641

HYDROGEN ION METER

Angus E. Cameron, Racine, Wis., assignor to B. D. Eisendrath Tanning Co., Chicago, Ill., a corporation of Illinois Application July 1, 1940, Serial No. 343,332

15 Claims. (Cl. 175—183)

This invention relates to hydrogen ion meters and has for its principal object to provide a simple, rugged and accurate hydrogen ion meter.

A further object of the invention is to provide a hydrogen ion meter in which a rugged electrical meter may be employed, both as a galvanometer and a volt meter.

A further object of the invention is to provide an improved hydrogen ion meter in which the hydrogen ion value may be indicated directly.

Other objects, advantages and capabilities of the invention will appear from the following description of a preferred embodiment thereof, taken in conjunction with the accompanying drawing, in which:

Figure 1 is a perspective view of an improved hydrogen ion meter embodying my invention;

Figure 2 is a sectional elevation through the glass electrode and the reference half-cell;

Figure 3 is a wiring diagram; and

Figure 4 is a fragmentary wiring diagram showing an equivalent or alternative modification.

Referring to the drawing, my improved meter may be housed in a portable box or cabinet 10 which is provided with an upper cover 11 and an end door 12 which is mounted to swing outwardly about a vertical axis. The upper edge of the door 12 is provided with a rib 13 and the cover 11 is provided with a recess 14. When the door 12 is closed and the cover 11 is closed, the rib 13 projects into the recess 14 and the door 12 is held against opening until the cover 11 is moved to open position. The cover 11 is held closed by a suitable fastening 15.

The upper side of the cover 11 may be provided with a carrying strap 16. Upon the inner side of the door 12 I provide a clip 17 mounted on a block 18. The clip 17 serves to engage the upper ends of the glass electrode 19 and the reference half-cell 20. Immediately below the effective ends of the glass electrode 19 and the reference half-cell 20 I mount a small shelf 21 which is pivotally mounted on a block 22 secured to the door 12.

It will readily be understood that the shelf 21 may be swung to the left, as viewed in Figure 1, and that a small beaker 23 containing a test sample may be elevated into the position shown in Figure 2 so that the lower portions of the glass electrode 19 and the reference half-cell 20 are immersed in the sample. Then the shelf 21 is swung back into normal position so that the beaker 23 is supported thereon while the determination is made.

The remaining electric devices are mounted on a chassis 24 which includes a panel 25 which extends over the principal portion of the box 10. The box 10 is provided with a vertical partition 26 which provides a small housing at the end of the box adjacent the door 12 for the reception of the devices mounted on the door when the door is closed. The glass electrode 19 is connected by an insulated conductor 27 to a plug 28 in the chassis and the reference half-cell 20 is connected by an insulated conductor 29 to a similar plug 30.

The partition 26 is provided with an opening 31 to render these plugs available for plugging in the conductors 27 and 29. Upon the panel 25 are mounted a fixed resistance 32a, a rheostat 32, a potentiometer 33, a potentiometer 34, a double-pole main switch 35, and a three-position three-pole switch 36. The switch 36 is biased to neutral or intermediate position and it can be displaced forwardly and rearwardly into its other positions.

The glass electrode is connected through a resistance 37 which may suitably be a two-megohm resistance, to the control grid 38 of a thermionic tube 39. The thermionic tube 39 may suitably be a 32-tube which has been exhausted to a very high degree. The screen grid 40 and the plate 41 are connected together and to the positive side of a B battery 42 which may suitably be a 22½ volt battery. The negative side of the B battery 42 may be connected through the winding of a 25,000 ohm rheostat 43 to the positive side of the filament 44. The positive side of the filament is connected through the fixed resistance 32a, suitably a 15-ohm resistance, and the rheostat 32, which may suitably be a 10-ohm rheostat, to the positive side of the A battery 45, which may suitably consist of two dry cells.

The negative side of the A battery 45 is connected to a contact 46 and to the positive side of the C battery 47. The negative side of the C battery 47 is connected to the arm 50 of the potentiometer 33 and to one of the poles 51 of the three-pole switch 36. The negative side of the filament 44 is connected to one of the poles 52 of the two-pole switch 35 and to contacts 48 and 49.

The conductor 29 from the reference half-cell 20 is connected to the arm 53 of the potentiometer 34 and also to the arm of a variable resistance 54, one end of which is connected to a contact 55. The resistance 54 may suitably have a value of 10,000 ohms. The potentiometer 34 may include a slide wire having a 450-ohm resistance. The potentiometer 33 may suitably have a slide wire having a 10,000 ohm resistance. The ends of these slide wires are connected together as shown in Figure 3, and they are supplied with voltage from a common cell 56 which may suitably be a dry cell and which is adapted to be turned on and off by the other pole 57 of the two-pole switch 35. When this switch is turned on, the arm 57 connects the battery 56 to the positive ends of the slide wires of the potentiometers 33 and 34 and the arm 52 is moved into engagement with the contact 46 so that the filament is heated.

When the switch 35 is moved to the off position, the circuit of the cell 56 is broken and the arm 52 is moved into engagement with the contact 58. The contact 58 is connected to contacts 59 and 60 and to the arm of the rheostat 43. The negative ends of the cell 56 and slide wires of the potentiometers 33 and 34 are connected by conductor 68 to contact 61. The 3-position switch 36 comprises the three poles 51, 62, and 63. The pole 62 is connected to the positive side of the microammeter 64 which suitably reads between 0 and 100 microamperes.

The pole 63 is connected to the negative side of the microammeter 64. The grid 38 is connected to contacts 66 and 67. When the 3-pole switch 36 is in normal or intermediate position, the arm 51 engages contact 66, the arm 62 engages contact 48, and the arm 63 engages contact 59.

When the switch 36 is thrown forwardly, the connection between the arm 51 and the grid 38 is opened, the arm 62 engages contact 49 and the arm 63 engages contact 60. When, however, the switch 36 is thrown rearwardly, the arm 51 engages contact 67 and remains connected to the grid 38, the arm 62 is moved into engagement with contact 55 and the arm 63 is moved into engagement with the contact 61.

As shown in Figure 4, the potentiometers 33 and 34 may be provided with individual cells 56' and 56" and the pole 57 may be replaced by two poles 57' and 57" which are connected to the pole 52 so that the three poles may be moved to on position simultaneously.

It is to be understood that my improved meter will read the voltage produced by any small source of voltage and that it may be used with any electrode system, such as glass, quinhydrone, hydrogen, or antimony electrodes within the limitations of the electrodes themselves. The apparatus is, however, primarily intended for use with a glass electrode and the calomel half-cell. The structures of the glass electrode and calomel half-cell are shown in Figure 2.

The glass electrode 19 comprises a tube 69 which has a thin wall bulb 70 at its lower end. Near the bulb 70, the tube 69 is provided with a waist or contraction 71. A smaller tube 72 extends through the tube 69 into the bulb 70. A copper wire 73 extends through the tube 72 and it is connected to a platinum wire 74. This platinum wire passes through a press or closed portion 75 of the tube 72.

Above the press 75, the tube 72 is provided with an enlarged or projecting portion 76 which rests upon the waist 71, thus locating the tube 72 in the glass electrode. The lower end of the tube 72 is open and the platinum wire 74 projects into this space. A drop of mercury 77 is held against the wire 74 by capillary attraction. Below the globule of mercury 77 is a layer or strata of saturated calomel solution, this solution containing a certain amount of undissolved calomel. The lowermost end of the tube 72 is closed by a plug of cotton 78 or other suitable fibrous material.

The bulb 70 contains any suitable solution. For example, this solution may consist of a mixture of M/20 potassium acid phthalate and decinormal potassium chloride.

After the tube 72 has been placed in position, the annular space between this tube and the tube 69 is filled with tar, asphalt, or other suitable material, which extends down to the waist 71 and enlargement 76. The upper end of the tube 72 may be enclosed in a sleeve 79 of plastic or other suitable material, through the upper end of which sleeve extends the insulated conductor 27.

The reference half-cell comprises an outer tube 80 which is preferably reduced as at 81 to smaller cross-sectional area which enables a beaker 23 of smaller size to be employed. As shown in Figure 2, the tube 80 may have an inclined portion 82 which brings the lower end of the tube 80 into close propinquity to the glass electrode. At approximately the level of the bulb 70 the tube 80 is provided with a small opening 83 and around the tube adjacent this opening is a tightly fitting rubber band 84.

The lower extremity of the tube 80 carries a projecting portion 85 which is preferably solid. This solid projecting portion 85 extends below the bulb 70 and preferably beyond the bulb as shown in Figure 2. From the previous description, it will be understood that the beaker 23 is moved upwardly past the bulb 70 and the position of the projecting arm 85 protects the bulb from accidental injury when placing the beaker in position.

The upper end of the tube 80 receives a tube 86, the lower end of which is precisely similar to the lower end of the tube 72 previously described. This lower end of the tube is immersed in a suitable solution within the tube 80, for example, a saturated solution of potassium chloride. The upper end of the tube 86 is supported in a rubber cork 87 or other suitable closure for the upper end of the tube 80.

The conductor 29 is connected through the copper wire 73 to the platinum wire 74 as in the glass electrode. It will be understood that a film of liquid extends along the interior of the rubber band 84 and that conductive connection is established between the liquid within the tube 80 and the glass electrode through this film of liquid.

To calibrate the instrument, which is a factory adjustment, the switch 35 is moved to the on position, thus heating the filament 44. The rheostat 32 is adjusted so that the voltage drop across the filament of the tube is approximately 1.6 volts. The switch 36 being in neutral position, the C battery 47 is connected to the grid 38. The rheostat 43 is then set to bring the microammeter to zero which is indicated by the reference numeral 1 on the dial.

The voltage developed across the winding of the rheostat 43 between the arm and the filament is then equal to the voltage across the tube filament. The rheostat 43 is then locked in this position, this being a factory adjustment. Thereafter, drift in voltage of filament or plate battery can be compensated for by adjusting the rheostat 32. Exhaustion of the filament battery can be indicated by a scale 88 on the panel 25 and the rheostat 32 may be mechanically arranged so that it reaches the end of its travel when the battery voltage has dropped to about 2.2. This shows that replacement of the A batteries is in order.

The potentiometer 33 is moved to zero position. The switch 36 is moved forwardly so as to disconnect the C battery from the grid 38 and 0.5914 volt from a potentiometer is applied to the plugs 28 and 30 and the potentiometer 34 is adjusted until the microammeter 64 shows zero deflection. The switch 36 is then moved rearwardly so that the arm 51 is brought into engagement with contact 67, arm 62 is brought into engagement with contact 55 and arm 63 is brought into engagement with contact 61. The rheostat 54 is then adjusted until the meter deflects to the full scale.

The meter is provided with a scale showing pH units, instead of microamperes, ten microamperes on the original scale being marked 1.0 pH and the full scale extending between 1 and 11 pH. The rheostat 54 is locked in this position of adjustment, this being a factory adjustment. It will be understood that the reference half-cell is always kept immersed so as to insure that the film of liquid persists between the rubber ring 84 and the wall of the tube 80.

To make a measurement, the following procedure is followed: The switch 35 is turned on. After a few seconds, the tube is heated and the rheostat 32 is adjusted so as to bring the meter needle to zero, that is, the pH 1 position. This adjustment corrects for any drift in the voltages of the batteries 45, 42 and 47, and any changes in vacuum tube characteristics.

The electrodes, that is, the glass electrode and the calomel half-cell, are immersed in a beaker of buffer solution of known pH, for example M/20 potassium acid phthalate of pH 4.00, and the switch 36 is moved rearwardly, that is, its switch arms are moved to the left, as viewed in Figure 3. The potentiometer 34 is moved until the meter reads pH 4.0. The switch 36 is then moved forwardly, that is, its arms are moved to the right, as viewed in Figure 3, and the rheostat 33 is adjusted until the meter needle returns to zero, that is, the pH 1.0 position. These adjustments should be made daily and the instrument is calibrated to read pH when the electrodes are immersed in an unknown solution. To make such a reading, a beaker 23 containing a sample of the liquid to be tested, is placed upon the shelf 21, the switch 36 is moved forwardly, that is, to move its arms to the right, as viewed in Figure 3, and the potentiometer 34 is then operated until the meter needle returns to zero position. The switch 36 is then mover rearwardly, that is, its arms are moved to the left, as viewed in Figure 3, and the deflection of the meter indicates directly the pH of the solution.

For successful operation of the device described, certain requirements should be fulfilled. The current demand of the grid 38 must be definitely smaller than the current which the high resistance glass electrode can supply. The connection between the glass electrode and the grid should be short, and sources of internal and external leakage should be minimized. The grid connection should preferably enter the cap of the tube. The potential applied to the grid by the C battery is chosen to be more negative than the free grid potential of the tube, that is, more negative than the potential which the grid attains from the electron cloud inside the tube when the grid is unconnected.

Furthermore, the tube must be evacuated to a very high degree. Residual gas in the tube results in the presence of positive ions which are attracted by the negatively charged grid. Special care must be taken in the evacuation of the tube, or tubes must be selected for high evacuation from a commercial supply. The positive ion current is, however, very much reduced in all cases by operating the tube at plate voltages of 18 volts or less, which tends to keep electron energies below the ionization value of residual gases. The filament temperature is kept low, so as to minimize the ionization of gas molecules which come in contact with the hot emitting surface.

It is preferred that the tubes should have a low amplification constant, for example, a mu of about 5–8, and as high a mutual conductance as is available in such a tube.

It is to be noted that it is not necessary to know the voltage supplied by the potentiometer 34, since the reading is given directly in pH units on a rugged microammeter, preferably of the moving coil type. Consequently, no standard cells are necessary. It may be noted that the high resistance 37 prevents the polarization of the electrode system, when the C bias voltage is applied to the grid 38.

It is to be noted that when the switch 35 is moved to the off position, and the switch 36 is in intermediate position, the microammeter 64 is shorted so that the microammeter is protected from shocks during transportation in the off condition.

It will be understood, of course, that other types of thermionic tubes may be used and that suitable changes may be made in the resistances and sources of voltages to adapt the meter to the characteristics of such tubes. Heater type tubes may be employed and in such cases the cathode may be connected to the positive terminal of the C battery.

Although the invention has been described in connection with specific details of a preferred embodiment thereof, it must be understood that such details are not intended to be limitative of the invention, except in so far as set forth in the accompanying claims.

Having thus described my invention, what I claim as new and desire to secure by Letters Patent of the United States is:

1. In a hydrogen ion meter, in combination, an electrode system, a thermionic tube having its grid connected to said electrode system, potentiometer means for applying a voltage in bucking relation to the voltage produced by said electrode system, a potentiometer means in bucking relation to first said potentiometer means, an electric meter adapted to be connected to the plate circuit of said tube, and means for connecting said meter to first said potentiometer means.

2. In a hydrogen ion meter, an electrode system, a thermionic tube having its grid connected to said electrode system, potentiometer means for applying a voltage in bucking relation to the voltage produced by said electrode system, a potentiometer means in bucking relation to first said potentiometer means, an electric meter adapted to be connected in the plate circuit of said tube, and a variable resistance connected to first said potentiometer means, and means for connecting the said electric meter to first said potentiometer means and to last said resistance in series.

3. In a hydrogen ion meter, in combination, a thermionic tube having a heated filament, a grid and a plate, a B battery connected to the plate, a resistor connected to the B battery and the positive side of said filament, an A battery, an adjustable resistor between the positive side of the filament and the positive side of the A battery, the negative side of the A battery being connected to the negative side of the filament, a C battery having its negative side connected to the grid and its positive side connected to the negative side of the A battery, an electric meter, and means for connecting said meter directly to the negative side of the A battery and to the plate circuit.

4. In a hydrogen ion meter, in combination, an electrode system, a thermionic tube having a filament, grid and plate, a potentiometer connected in bucking relation to said electrode system, a potentiometer arranged in bucking relation to the first said potentiometer, an electric meter adapted to indicate the plate current in said tube, and means for connecting the electric meter to measure the potential of the first said potentiometer.

5. In a hydrogen ion meter, in combination, an electrode system, a thermionic tube having a filament, grid and plate, a potentiometer connected in bucking relation to said electrode system, a potentiometer arranged in bucking relation to the first said potentiometer, an electric meter adapted to indicate the plate current in said tube, means for connecting the electric meter to measure the potential of the first said potentiometer, and a calibrating resistor between first said potentiometer and said electric meter.

6. In a hydrogen ion meter, in combination, a thermionic tube, a glass electrode and a reference half-cell, one of said elements being connected to the grid of said thermionic tube, variable voltage supplying means connected to the other element, variable voltage supplying means connected in bucking relation to the first voltage supplying means, a C battery connected to last said voltage supplying means, means for connecting the C battery directly to the grid and a high resistance between the first said element and the grid and C battery when thus connected.

7. A hydrogen ion meter comprising a glass electrode, a reference half-cell, a thermionic tube comprising a filament, grid and plate, a resistor connected to said glass electrode and to said grid, a B battery connected to the plate, a resistor, said resistor being connected to the B battery and to the filament, an A battery connected to the filament, a C battery connected to the filament, a potentiometer connected to the reference half-cell in bucking relation to the voltage produced by the electrode system, a potentiometer connected to the first said potentiometer in bucking relation thereto, and connected to the C battery, a shunt connection for connecting the C battery directly to the grid, an electric meter, and means for connecting the meter to the plate circuit, and means for connecting the meter to the first said potentiometer.

8. A hydrogen ion meter comprising a glass electrode, a reference half-cell, a thermionic tube comprising a filament, grid and plate, a resistor connected to said glass electrode and to said grid, a B battery connected to the plate, a resistor, the B battery being connected to last said resistor and last said resistor being connected to the filament, an A battery connected to the filament, a C battery connected to the filament, a potentiometer connected to the reference half-cell in bucking relation to the voltage produced by the electrode system, a potentiometer connected to the first said potentiometer in bucking relation thereto, and connected to the C battery, a shunt connection for connecting the C battery directly to the grid, an electric meter, and means for connecting the meter to the plate circuit, means for connecting the meter to the first said potentiometer, and a calibrating rheostat in series with said meter and first said potentiometer.

9. In a hydrogen ion meter, in combination, an electrode system, a thermionic tube having its grid connected to said electrode system, potentiometer means for applying a voltage in bucking relation to the voltage produced by said electrode system, a potentiometer means in bucking relation to first said potentiometer means, an electric meter adapted to be connected to the plate circuit of said tube, means for connecting the electric meter to first said potentiometer means, and means associated therewith for correlating the potentiometer voltage to the scale of the electric meter.

10. In a hydrogen ion meter, in combination, a thermionic tube having a filament and a plate, a source of A voltage applied to said filament, a plate circuit including a source of B voltage and a resistor, a galvanometer, switching means for connecting said resistor, filament and galvanometer in series, and means for varying the plate current to bring the algebraic sum of the voltages across the filament and across said resistor to a standard value.

11. A hydrogen ion meter comprising an electrode system, a thermionic tube having a filament, grid and plate, said grid being arranged for connection to said electrode system, potentiometer means for applying a voltage in bucking relation to the voltage produced by said electrode system, a potentiometer means in bucking relation to first said potentiometer means, an electric meter, a plate circuit including a source of B supply and a resistor connected to said plate and said filament, and switching means for connecting said galvanometer to first said potentiometer means in one position, for connecting the grid of said tube to its cathode and for connecting the galvanometer, said resistor and filament in series in another position, and for connecting the galvanometer, said resistor and filament in series and breaking the connection between the grid and the cathode in a third position.

12. In a hydrogen ion meter, in combination, a thermionic tube having a heated filament, a grid and a plate, a B battery connected to the plate, a resistor connected to the B battery and the positive side of said filament, an A battery, an adjustable resistor between the positive side of the filament and the positive side of the A battery, the negative side of the A battery being connected to the negative side of the filament, an electric meter, and means for connecting said meter directly to the negative side of the A battery and to the plate circuit.

13. A hydrogen ion meter comprising a glass electrode, a reference half-cell, a thermionic tube comprising a filament, grid and plate, a resistor connected to said glass electrode and to said grid, a B battery connected to the plate, a resistor, said resistor being connected to the B battery and to the filament, an A battery connected to the filament, a potentiometer connected to the reference half-cell in bucking relation to the voltage produced by the electrode system, a potentiometer connected to first said potentiometer in bucking relation thereto, a shunt connection for connecting the filament to the grid, an electric meter, means for connecting the meter to the plate circuit, and means for connecting the meter to the first said potentiometer.

14. A hydrogen ion meter comprising a glass electrode, a reference half-cell, a thermionic tube comprising a filament, grid and plate, a B battery connected to the plate, a resistor connected to the B battery and to the filament, an A battery connected to the filament, a potentiometer connected to the reference half-cell in bucking relation to the voltage produced by the electrode system, a potentiometer connected to the first said potentiometer in bucking relation thereto and connected to the filament, a shunt connection for connecting the filament directly to the grid, an electric meter, and means for connecting the meter to the plate circuit, means for connecting the meter to the first said potentiometer and a calibrating rheostat in series with said meter and first said potentiometer.

15. In a hydrogen ion meter, in combination, a thermoelectric tube comprising a plate, a control grid and a filament, a direct source of filament current and a variable resistance in series therewith, a B battery connected to said plate and a resistance connected to said B battery and directly to the positive side of said filament, a galvanometer, means for connecting said galvanometer directly to the negative side of said filament and directly to last said resistance whereby the first said resistance can be adjusted to counterbalance the voltage drop of the filament against the voltage drop of last said resistance.

ANGUS E. CAMERON.